United States Patent
Jette

(10) Patent No.: US 10,944,355 B2
(45) Date of Patent: Mar. 9, 2021

(54) CABLE MANAGEMENT SYSTEMS AND METHODS FOR PHOTOVOLTAIC SYSTEMS AND OTHER CABLE-DEPENDENT SYSTEMS

(71) Applicant: Cable Management Solutions Inc., Bayshore, NY (US)

(72) Inventor: Roger Jette, West Islip, NY (US)

(73) Assignee: Cable Management Solutions Inc., Bayshore, NY (US)

( * ) Notice: Subject to any disclaimer, the term of this patent is extended or adjusted under 35 U.S.C. 154(b) by 54 days.

(21) Appl. No.: 16/359,155

(22) Filed: Mar. 20, 2019

(65) Prior Publication Data

US 2020/0304061 A1 Sep. 24, 2020

(51) Int. Cl.
  *F16L 3/14* (2006.01)
  *H02S 30/00* (2014.01)
  *F16L 3/223* (2006.01)
  *H02G 3/30* (2006.01)

(52) U.S. Cl.
  CPC .............. *H02S 30/00* (2013.01); *F16L 3/14* (2013.01); *F16L 3/2235* (2013.01); *H02G 3/30* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 2,318,859 A | * | 5/1943 | Huguelet | H02G 5/025 248/68.1 |
| 2,425,935 A | * | 8/1947 | Lowell | F16L 3/2235 174/135 |
| RE26,011 E | * | 5/1966 | Girard | F16L 3/222 248/68.1 |
| 4,099,626 A | * | 7/1978 | Magnussen, Jr. | A47B 63/02 211/194 |
| 4,199,070 A | * | 4/1980 | Magnussen, Jr. | A47B 63/02 138/112 |
| 4,419,535 A | | 12/1983 | O'Hara | |

(Continued)

OTHER PUBLICATIONS

Partial European Search Report issued in corresponding European Application No. 20163705.5 dated Jun. 26, 2020, 12 pages.

(Continued)

*Primary Examiner* — Monica E Millner
(74) *Attorney, Agent, or Firm* — Carter, DeLuca & Farrell LLP

(57) ABSTRACT

A cable management system includes a cable-retaining spacer block defining a plurality of cylindrical passages arranged to define a rectangular array. Each cylindrical passage is configured to receive a transmission cable. Brackets are configured to support ends of the cable-retaining spacer block and enable suspension from a support cable. Another cable management system includes a center base, first and second intermediate wings configured to operably couple to the center base to define a first plurality of cylindrical passages configured to retain transmission cables therein, and first and second outer wings configured to operably couple to the first and second intermediate wings to define a second plurality of cylindrical passages configured to retain transmission cables therein. These cable management systems enable snap-together engagement without the use of tools, thus facilitating assembly.

13 Claims, 9 Drawing Sheets

(56) References Cited

U.S. PATENT DOCUMENTS

| | | | |
|---|---|---|---|
| 4,601,447 A * | 7/1986 | McFarland | F16L 3/222 |
| | | | 248/49 |
| 5,123,547 A * | 6/1992 | Koch | F16L 3/2235 |
| | | | 211/59.4 |
| 5,992,802 A | 11/1999 | Campbell | |
| 7,080,864 B2 * | 7/2006 | Casteran | B65D 85/20 |
| | | | 211/60.1 |
| 7,345,241 B2 | 3/2008 | Caveney et al. | |
| 7,952,027 B2 | 5/2011 | Grelck | |
| 8,133,049 B1 * | 3/2012 | Sullivan | F27D 5/0012 |
| | | | 432/258 |
| 8,193,448 B2 | 6/2012 | Syed | |
| 8,294,030 B2 | 10/2012 | Pollard, Jr. | |
| 8,342,474 B2 * | 1/2013 | Gilbreath | F16L 3/222 |
| | | | 248/558 |
| 9,038,967 B2 | 5/2015 | Struck et al. | |
| 10,141,731 B2 | 11/2018 | Pawluk | |
| 10,717,589 B2 * | 7/2020 | Lu | B65D 85/20 |
| 2010/0123048 A1 | 5/2010 | Pollard, Jr. | |
| 2017/0184223 A1 | 6/2017 | Dean et al. | |

OTHER PUBLICATIONS

Snake Tray: "Solar-Max-Main", Nov. 9, 2017 (Nov. 9, 2017), XP055576542, retrieved from the internet: URL: http://www.snaketray.com/product-catalog/utility-grade-solar-snake-tray/snake-max/solar-max-main/ [retrieved on Apr. 2, 2019]p. 2.
European Search Report issued in European Appln. No. 19 15 1191 dated Apr. 2, 2019.
Written Opinion issued in EP 19151191.

\* cited by examiner

CABLE MANAGEMENT SYSTEMS AND METHODS FOR PHOTOVOLTAIC SYSTEMS AND OTHER CABLE-DEPENDENT SYSTEMS

BACKGROUND

Technical Field

The present disclosure relates to cable management. More particularly, the present disclosure relates to cable management systems and methods for use with photovoltaic systems and other cable-dependent systems.

Background of Related Art

Solar power has become increasingly popular in recent years as an alternative to finite energy sources such as oil and coal. In particular, commercial and residential property photovoltaic systems have become a viable, cost-effective option for business owners and homeowners. A typical photovoltaic system includes a plurality of solar modules that are positioned to form a solar array for converting sunlight into DC power. The photovoltaic system further includes various supporting components such as, for example, inverters, power-conditioning equipment, power-storage equipment, safety equipment, instrumentation, meters, etc., to enable the safe and efficient collection, conversion, storage, and/or transport of power.

Mounting components are also required for a typical photovoltaic system, in order to mount the solar array in an appropriate position to facilitate the collection of sunlight. In addition to such mounting components, it would be desirable to provide an easy-to-install, organized, space-efficient cable management system to facilitate the routing of cables to the various components of the photovoltaic system, for example, the solar modules, inverters, power-conditioning equipment, power-storage equipment, safety equipment, instrumentation, meters, etc.

SUMMARY

Provided in accordance with the present disclosure is an easy-to-install, organized, space-efficient cable management systems and methods that facilitate the routing of cables to various components of a system such as, for example, a photovoltaic system, and ensure appropriate spacing between the cables to inhibit interference and/or eliminate the need to de-rate the cables. The cable management systems and methods of the present disclosure, however, are not limited to use in a photovoltaic system; rather, the cable management systems and methods of the present disclosure may be utilized in any suitable industry and/or for any suitable purpose. Some or all of the management systems provided herein enable snap-together engagement without the use of tools, thus facilitating assembly. The above and other aspects and features of the present disclosure are detailed below. To the extent consistent, any of the aspects and features detailed herein may be utilized with any or all of the other aspects and features detailed herein.

In accordance with aspects of the present disclosure, a cable management system is provided including a cable-retaining spacer block and first and second brackets. The cable-retaining spacer block defines a plurality of cylindrical passages arranged to define a rectangular array. Each cylindrical passage of the plurality of cylindrical passages is configured to receive a transmission cable. The first and second brackets support first and second end portions, respectively, of the cable-retaining spacer block. Each of the first and second brackets is configured for suspension from a support cable to thereby suspend the cable-retaining spacer block between and from the support cables.

In an aspect of the present disclosure, the cable-retaining spacer block includes a plurality of block components stacked relative to one another.

In another aspect of the present disclosure, the plurality of block components includes a base block component, a cover block component, and a plurality of intermediate block components disposed between the base block component and the cover block component.

In still another aspect of the present disclosure, each block component defines semi-cylindrical channels that cooperate with semi-cylindrical channels of an adjacently-stacked block component to define the cylindrical passages.

In yet another aspect of the present disclosure, the plurality of block components are configured to be alternatingly loaded with transmission cables and stacked relative to one another to enclose the transmission cables within the cylindrical passages.

In still yet another aspect of the present disclosure, each of the first and second brackets includes a notch configured to receive the respective support cable.

In another aspect of the present disclosure, each of the first and second brackets is configured to expand and resiliently return to receive and engage the respective support cable.

In an aspect of the present disclosure, at least one of the cable-retaining spacer block or the first and second brackets is configured to be supported on a mounting structure. In such aspects, the at least one of the cable-retaining spacer block or the first and second brackets may be configured to be supported on a platform of the mounting structure. Further, the mounting structure may be configured to be secured to at least one vertical support.

Another cable management system provided in accordance with aspects of the present disclosure includes a center base, first and second intermediate wings, and first and second outer wings. The center base has first and second sides each defining a plurality of channels. The first and second intermediate wings each define a plurality of inwardly-facing channels and a plurality of outwardly-facing channels. The first and second intermediate wings are configured to operably couple to the first and second sides of the center base, respectively, such that the plurality of inwardly-facing channels of the first and second intermediate wings cooperate with corresponding channels of the plurality of channels of the first and second sides of the center base, respectively, to define a first plurality of cylindrical passages configured to retain transmission cables therein. The first and second outer wings each define a plurality of inwardly-facing channels. The first and second outer wings are configured to operably couple to the first and second intermediate wings, respectively, such that the plurality of inwardly-facing channels of the first and second outer wings cooperate with corresponding channels of the plurality of outwardly-facing channels of the first and second intermediate wings, respectively, to define a second plurality of cylindrical passages configured to retain transmission cables therein.

In an aspect of the present disclosure, the first and second intermediate wings are configured to pivotably couple to the first and second sides of the center base, respectively.

In another aspect of the present disclosure, the first and second intermediate wings are pivotable relative to the center base between an open position, enabling insertion of transmission cables into the plurality of channels of the center base, and a closed position, defining the first plurality of cylindrical passages to retain the transmission cables therein In still another aspect of the present disclosure, the first and second intermediate wings are configured for at least partial receipt within slots defined on the first and second sides of the center base in the closed position.

In yet another aspect of the present disclosure, the first and second outer wings are configured to slidably engage the first and second intermediate wings, respectively.

In still yet another aspect of the present disclosure, the first and second outer wings are slidable relative to the first and second intermediate wings, respectively, between a disengaged position, enabling insertion of transmission cables into the plurality of outwardly-facing channels of the first and second intermediate wings, respectively, and an engaged position, defining the second plurality of cylindrical passages to retain the transmission cables therein.

In another aspect of the present disclosure, the first and second outer wings are configured to at least partially receive the first and second intermediate wings within slots defined within the first and second outer wings in the engaged position.

In yet another aspect of the present disclosure, the center base defines a spine extending between the first and second sides thereof. In aspects, the spine may define a slot configured to receive a support cable to enable suspension of the spine from the support cable.

BRIEF DESCRIPTION OF THE DRAWINGS

Various aspects and features of the present disclosure are described hereinbelow with reference to the drawing figures, wherein.

DETAILED DESCRIPTION

Figure 1:
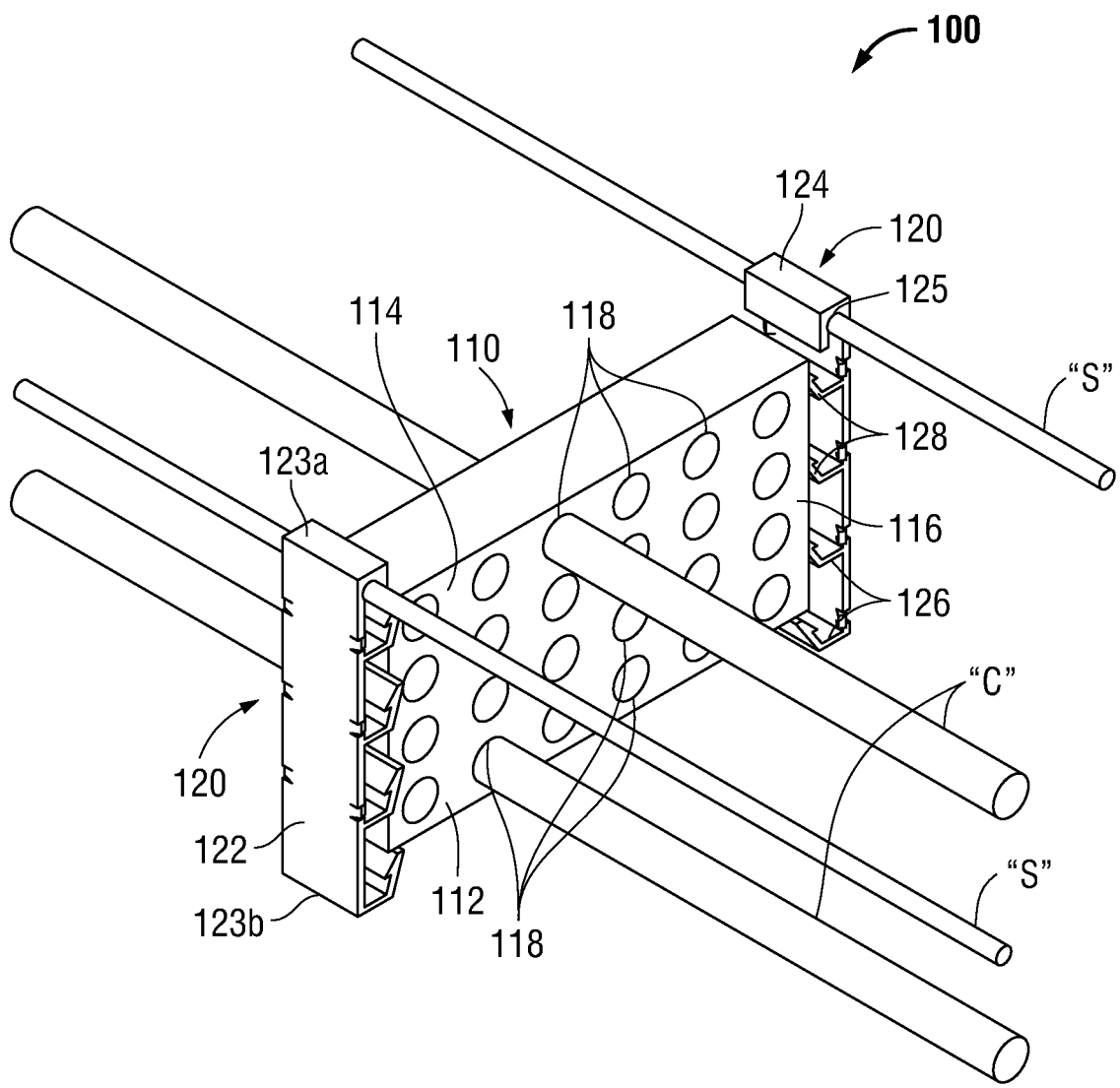
FIG. 1 is a perspective view of a cable management system provided in accordance with the present disclosure shown suspended via a pair of support cables and retaining transmission cables therein.
Figure 2:
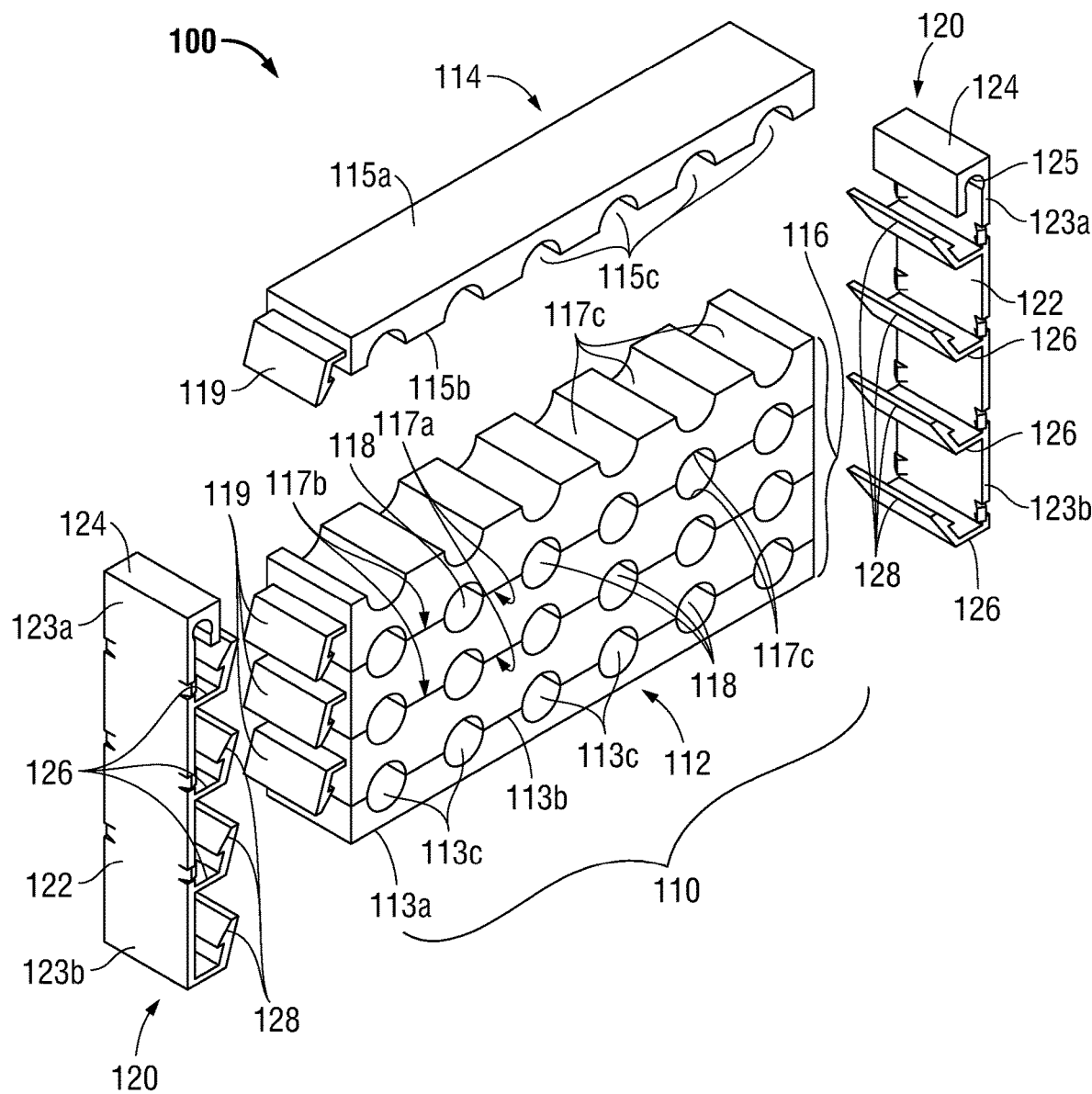
FIG. 2 is a partially-exploded, perspective view of the cable management system of FIG. 1.
Figure 3:
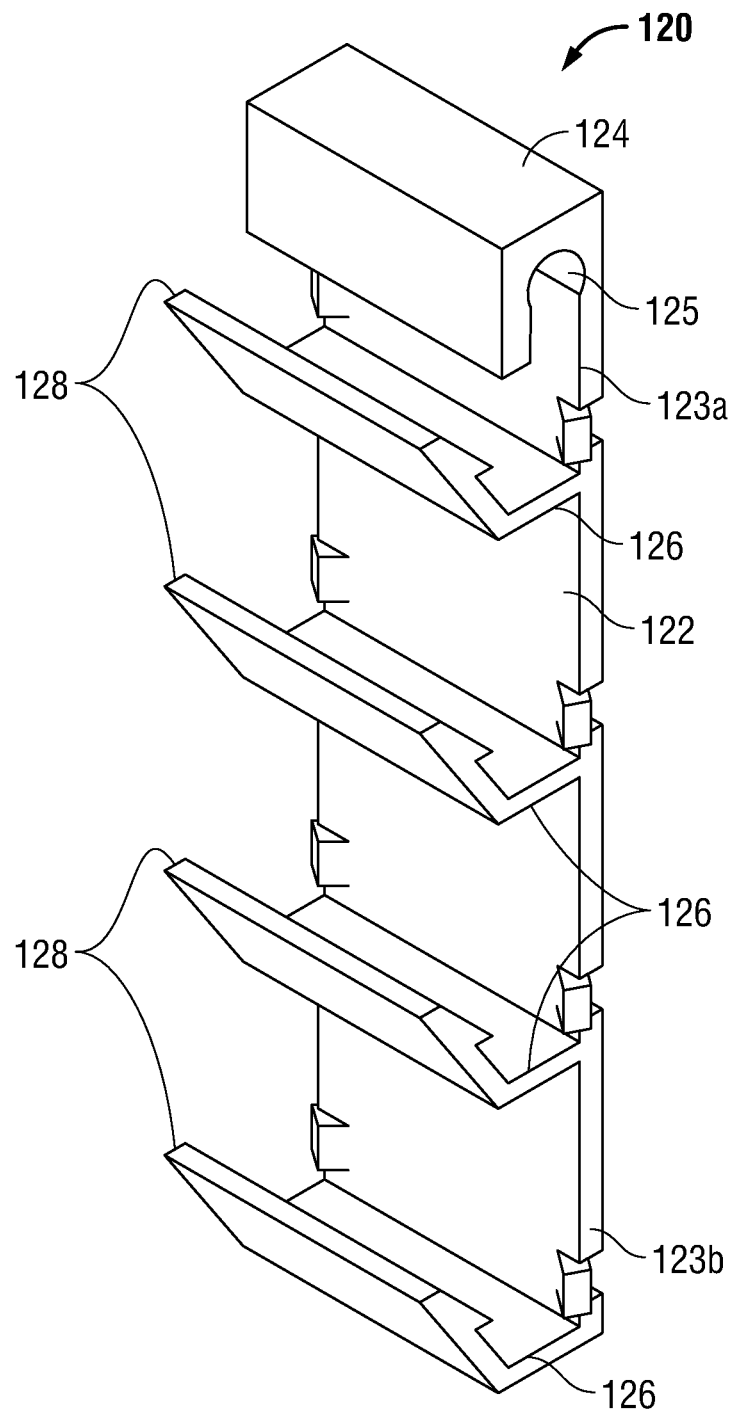
FIG. 3 is a perspective view of a bracket of the cable management system of FIG. 1.

Referring generally to FIGS. 1-3, a cable management system provided in accordance with the present disclosure is shown generally identified by reference numeral 100. Cable management system 100 is an easy-to-install, organized, space-efficient cable management system that facilitates the routing of cables to various components of a system such as, for example, a photovoltaic system, while ensuring appropriate spacing between the cables to inhibit interference and/or eliminate the need to de-rate the cables.

Cable management system 100 includes one or more cable-retaining spacer blocks 110 each having a pair of brackets 120 configured to engage that cable-retaining spacer block 110 therebetween. Although only one cable-retaining spacer block 110 and associated brackets 120 are illustrated and described below, it is understood that cable management system 100 may include any suitable number of cable-retaining spacer blocks 110 and associated brackets 120 provided at suitable intervals to retain and maintain appropriate spacing of cables along any suitable distance. As detailed below, cable management system 100 is configured to be suspended from a pair of support cables "S," such as, for example, metal wire rope, and is configured to retain a plurality of transmission cables "T" in an appropriately spaced-manner. Transmission cable "T" as utilized herein refers to a cable configured to transmit electrical, optical, or other suitable signals therealong such as, for example, to enable transmission of power, control signals, information, etc. Support cable "S" as utilized herein refers to a cable utilized for mechanical support although, in embodiments, the support cable "S" can be utilized for both mechanical support and transmission of signals. As also detailed below, some or all of the cable-retaining spacer blocks 110 and associated brackets 120 of cable management system 100 may further be configured for mounting on mounting structures "M" secured to vertical supports "V" (see FIGS. 4-5; only one mounting structure "M" and vertical support "V" are illustrated).

With reference to FIGS. 1 and 2, cable-retaining spacer block 110 is formed from a plurality of block components including a base block component 112, a cover block component 114, and a plurality of intermediate block components 116. Base and cover block components 112, 114, respectively, may be identical and used in inverted orientation relative to one another, or may be distinct components including one or more distinguishing features. Base block component 112 includes a bottom surface 113a and an opposing top surface 113b defining a plurality of semi-cylindrical channels 113c. Channels 113c are parallel to one another and spaced-apart relative to one another a suitable distance to inhibit interference and/or eliminate the need to de-rate transmission cables "T" seated within adjacent channels 113c.

Cover block component 114 includes a top surface 115a and an opposing bottom surface 115b defining a plurality of semi-cylindrical channels 115c. Channels 115c are parallel to one another and spaced-apart relative to one another a suitable distance, equal to distance between channels 113c, to inhibit interference and/or eliminate the need to de-rate between transmission cables "T" seated within adjacent channels 115c.

Each intermediate block component 116 includes a top surface 117a and an opposing bottom surface 117b each defining a plurality of semi-cylindrical channels 117c parallel to one another and spaced-apart relative to one another a suitable distance, equal to distance between channels 113c and 115c, to inhibit interference and/or eliminate the need to de-rate transmission cables "T" seated within horizontally adjacent channels 117c. Further, each intermediate block component 116 defines a sufficient height to inhibit interference and/or eliminate the need to de-rate transmission cables "T" seated within vertically-adjacent channel 117c of intermediate block components 116.

During assembly, the block components 112, 114, 116 of cable-retaining spacer block 110 are stacked on top of one another with transmission cables "T" seated within the open semi-cylindrical channels 113c, 115c, 117c of the last-stacked component 112, 114, 116 and enclosed therein via the opposed semi-cylindrical channel 113c, 115c, 117c of the next-stacked component 112, 114, 116. More specifically, transmission cable(s) "T" is seated within one or more of the semi-cylindrical channels 113c of base block component 112, followed by stacking of an intermediate block component 116 on the base block component 112 with the opposing channels 113, 117c, respectively, thereof aligned with one another such that each pair of channels 113, 117c forms a cylindrical passage 118 enclosing and retaining the transmission cable(s) "T" therein.

Next, an additional transmission cable(s) "T" is seated within one or more of the semi-cylindrical channels 117c of top surface 117a of the previously-positioned intermediate block component 116 and a further intermediate block component 116 is stacked thereon with the opposing channels 117c of the intermediate block components 116 aligned with one another to form a cylindrical passage 118 enclosing and retaining the additional transmission cable(s) "T" therein. The above may be repeated as many times as desired to stack additional intermediate block components 116 to retain more transmission cables "T." That is, the number of intermediate block components 116 is selected, for example, based upon the number of transmission cables "T" to be retained via cable-retaining spacer block 110.

Once the final intermediate block component 116 is stacked, a further transmission cable(s) "T" is seated within one or more of the semi-cylindrical channels 117c of the top surface 117a of the final intermediate block component 116 and cover block component 114 is stacked thereon with the opposing channels 115c, 117c aligned with one another to form a cylindrical passage 118 enclosing and retaining the further transmission cable(s) "T" therein, thus fully forming the cable-retaining spacer block 110 to define a rectangular array of spaced-apart cylindrical passages 118 for receipt of transmission cables "T."

The stacked block components 112, 114, 116 forming cable-retaining spacer block 110 may be maintained in position via brackets 120, as detailed below, and/or may be maintained in position relative to one another via other suitable engagements such as, for example, cooperating latching components, complementary male-female features, adhesives, external latching devices, etc. In other embodiments, cable-retaining spacer block 110 is pre-assembled or monolithically formed and free ends of transmission cables "T" are routed through the cylindrical passages 118.

Some or all of block components 112, 114, 116 may include cantilever engagement feet 119 extending outwardly from opposing ends thereof (see FIG. 2, feet 119 are only shown at one end of the cover and intermediate block components 114, 116).

Referring to FIGS. 1-3, brackets 120 are configured for positioning on either side of cable-retaining spacer block 110 and may be identical and used in opposite orientation relative to one another, or may be distinct components including one or more distinguishing features. Each bracket 120 includes a back wall 122, a hanger clip 124, and a plurality of cantilever engagement legs 126. Back wall 122 extends vertically to define a top end portion 123a and a bottom end portion 123b.

Hanger clip 124 extends from the top end portion 123a of back wall 122 of each bracket 120 in generally perpendicular orientation relative to back wall 122. Hanger clip 124 defines a cable-receiving notch 125 configured to receive a support cable "S" therein. In embodiments, a portion of cable-receiving notch 125 defines a minimum diameter that is equal to or slightly less than the diameter of the support cable "S" such that hanger clip 124 is expanded to receive the support cable "S" and resiliently returned upon receipt of the support cable "S" within notch 125 to engage the support cable "S" therein. However, other suitable engagements are also contemplated. Regardless of the particular engagement configuration, hanger clips 124 enable brackets 120 to be engaged with and suspended from support cables "S."

Cantilever engagement legs 126 are spaced-apart along at least a portion of the length of back wall 122. An upper-most leg 126 is spaced-apart from hanger clip 124 at top end portion 123a of back wall 122. A lower-most leg 126 may be disposed at the bottom end portion 123b of back wall 122. One or more additional legs 126 is disposed between the upper-most and lower-most legs 126. However, other suitable leg configurations are also contemplated.

Each leg 126 includes a foot 128 extending from the free end thereof at an angle relative to the remainder of the corresponding leg 126. Each foot 128 is capable of supporting the bottom surface 113a of base block component 112 of cable-retaining spacer block 110 at an end thereof (such that the pair of brackets 120 support cable-retaining spacer block 110 at each end thereof), and the foot 128 utilized for such depends upon the number of intermediate block components 116 and, thus, the overall height of cable-retaining spacer block 110. Some or all of the remaining feet 128 are configured to engage the corresponding cantilever engagement feet 119 extending from block components 112, 114 and/or 116 to engage and support cable-retaining spacer block 110 between brackets 120, e.g., via interlocking engagement of feet 119, 128, and, thus, suspended from support cables "S." However, in some embodiments, feet 119 are not provided. Other suitable engagement configurations in addition or as an alternative to engagement of feet 119, 128 are also contemplated.

Figure 4:
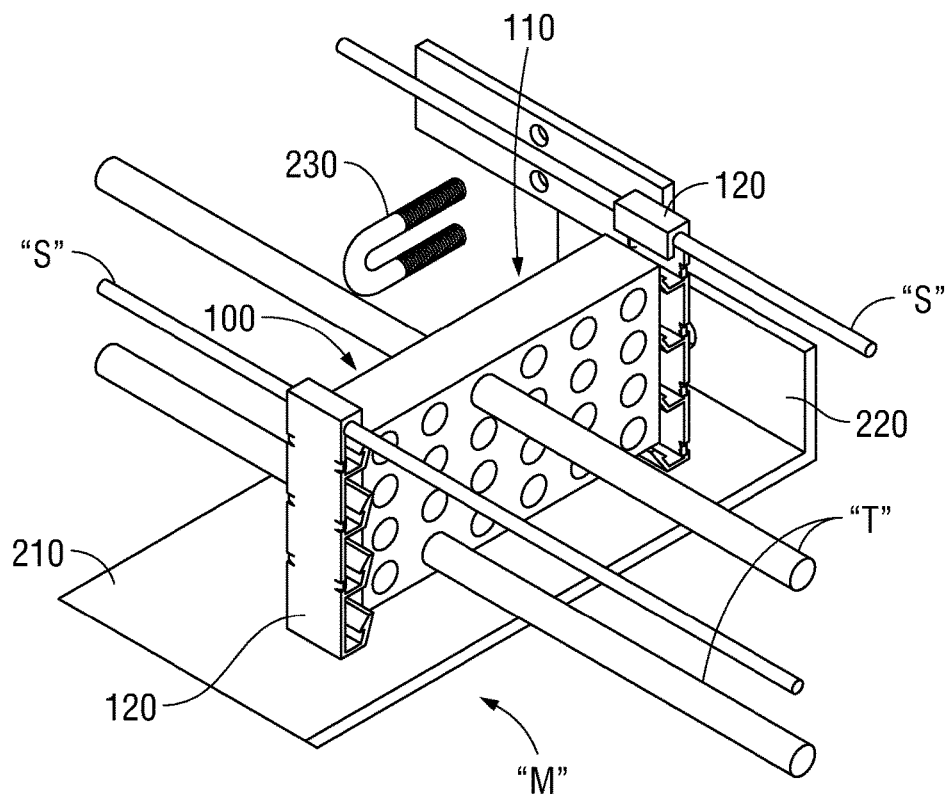
FIG. 4 is a perspective view of the cable management system of FIG. 1 supported on a mounting structure.
Figure 5:
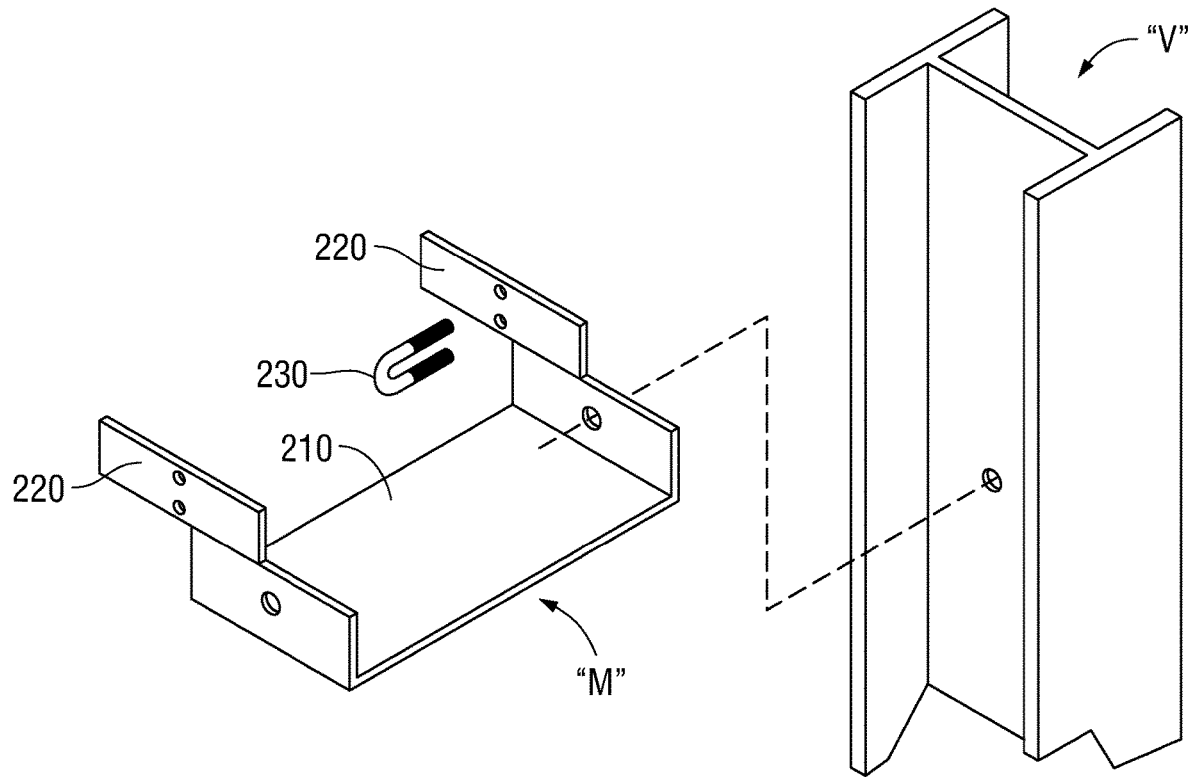
FIG. 5 is an exploded, perspective view of the mounting structure of FIG. 4 and a vertical support for supporting the mounting structure.

Referring to FIGS. 4-5, in conjunction with FIGS. 1 and 2, as noted above, in embodiments, some or all of the cable-retaining spacer block 110 and associated brackets 120 of cable management system 100 may be mounted on mounting structures "M" that are secured to vertical supports "V" on either or both sides thereof, thus enabling suspension of cable management system 100 above a surface, e.g., the ground, a roof, etc.

Mounting structures "M" may each include a platform 210 and a pair of uprights 220 extending from either side of platform 210. Platform 210 is configured to support one of the cable-retaining spacer block 110 and associated brackets 120 of cable management system 100 thereon. Either or both uprights 220 are configured to be bolted or otherwise mounted to one of the vertical supports "V." U-shaped bolts 230 may also be utilized to secure uprights 220 of the mounting structure "M" to the support cables "S" such that mounting structure "M" is suspended therefrom, in addition or as an alternative to the mounting of the mounting structures "M" to vertical supports "V."

Turning to FIGS. 6A-10B, another cable management system provided in accordance with the present disclosure is shown generally identified by reference numeral 300. Cable management system 300 is an easy-to-install, organized, space-efficient cable management system that facilitates the routing of cables to various components of a system such as, for example, a photovoltaic system, while ensuring appropriate spacing between the cables to inhibit interference and/or eliminate the need to de-rate the cables.

Figure 6A:
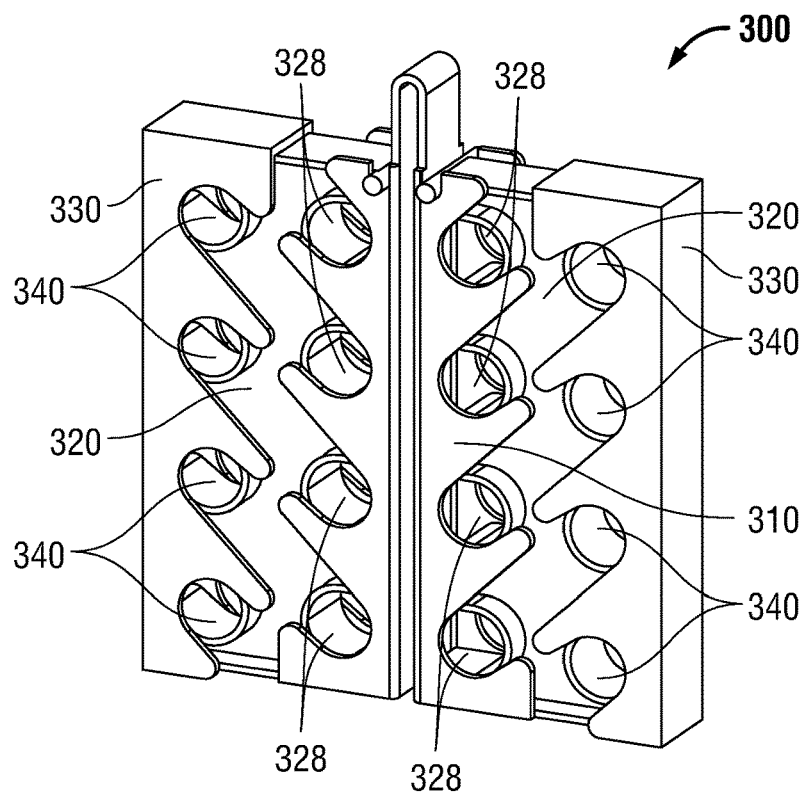
FIGS. 6A and 6B are perspective and front views, respectively, of another cable management system provided in accordance with the present disclosure.
Figure 6B:
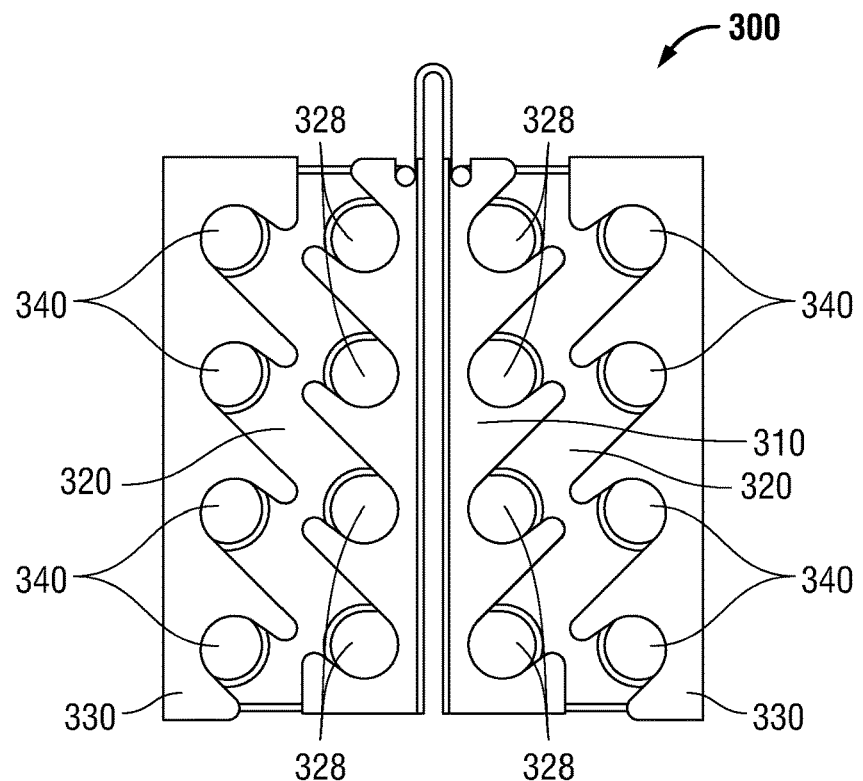

Referring to FIGS. 6A and 6B, cable management system 300 includes a center base 310, first and second intermediate wings 320 configured to operably couple to center base 310 on first and second opposing sides, respectively, of center base 310, and first and second outer wings 330 configured for positioning about the first and second intermediate wings 320, respectively. Although only one center base 310 and associated intermediate and outer wings 320, 330, respectively, are illustrated and described below, it is understood that cable management system 300 may include any suitable number of center bases 310 and associated intermediate and outer wings 320, 330, respectively, provided at suitable intervals to retain and maintain appropriate spacing of cables along any suitable distance.

Figure 7A:
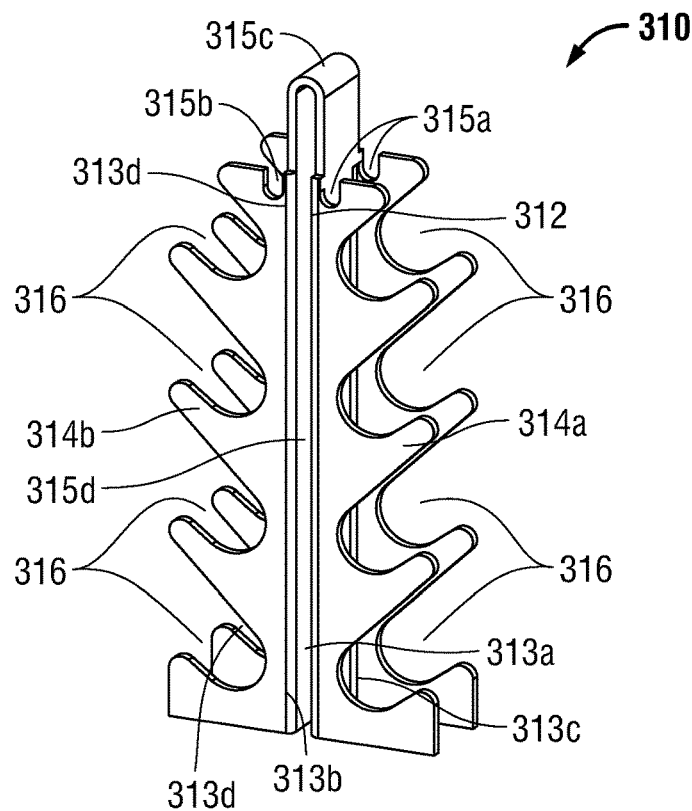
FIGS. 7A and 7B are perspective and front views, respectively, of a center base of the cable management system of FIGS. 6A and 6B.
Figure 7B:
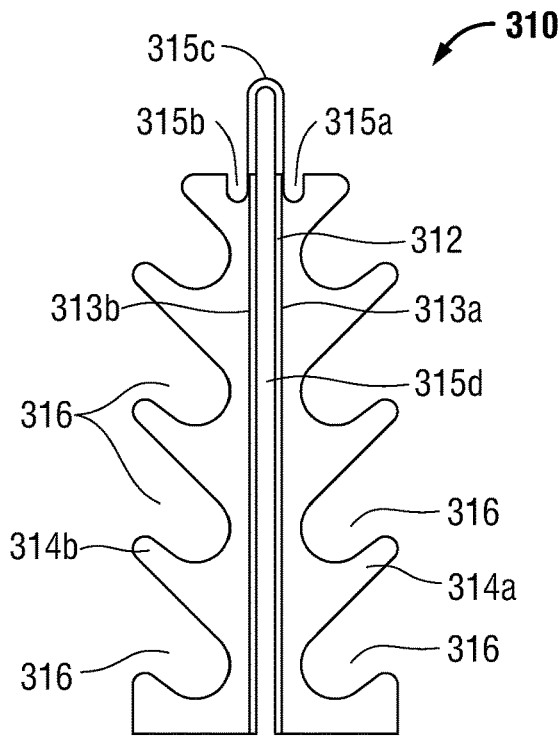
Figure 8A:
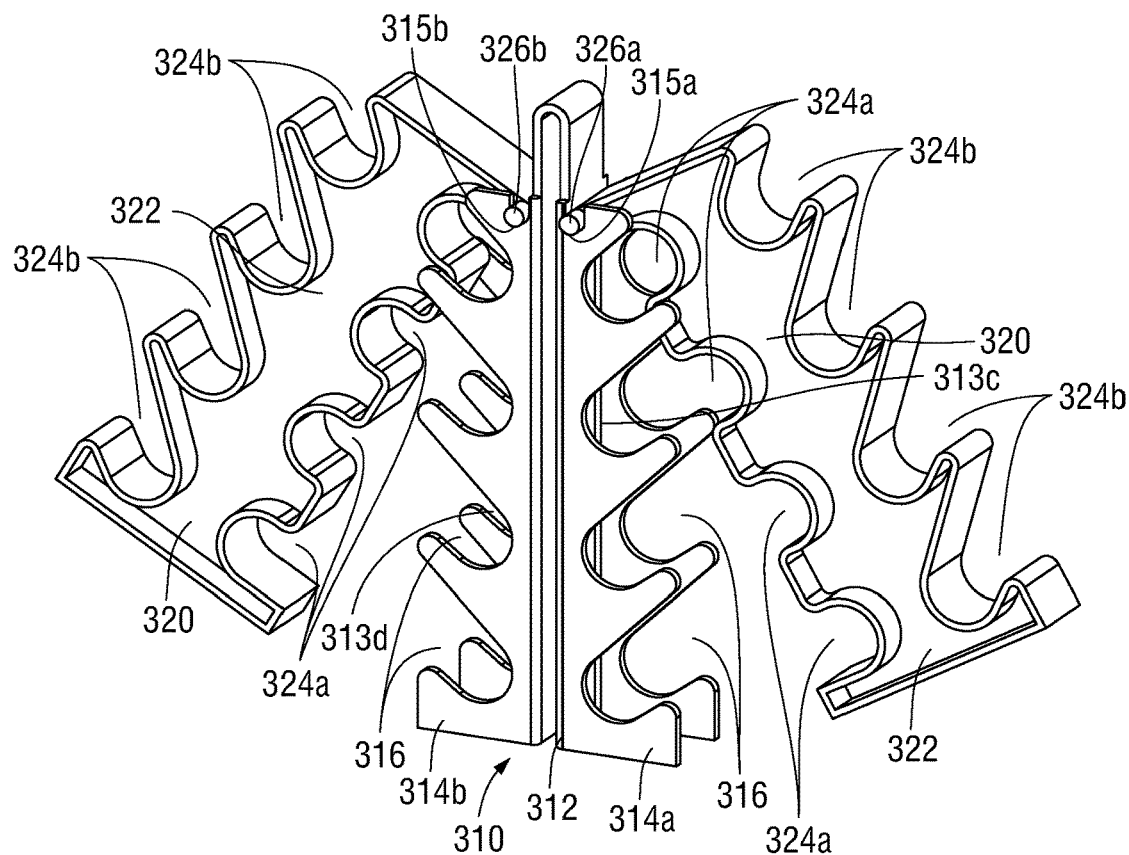
FIGS. 8A and 8B are perspective and front views, respectively, illustrating intermediate wings pivotably coupled to the center base of the cable management system of FIGS. 6A and 6B.
Figure 8B:
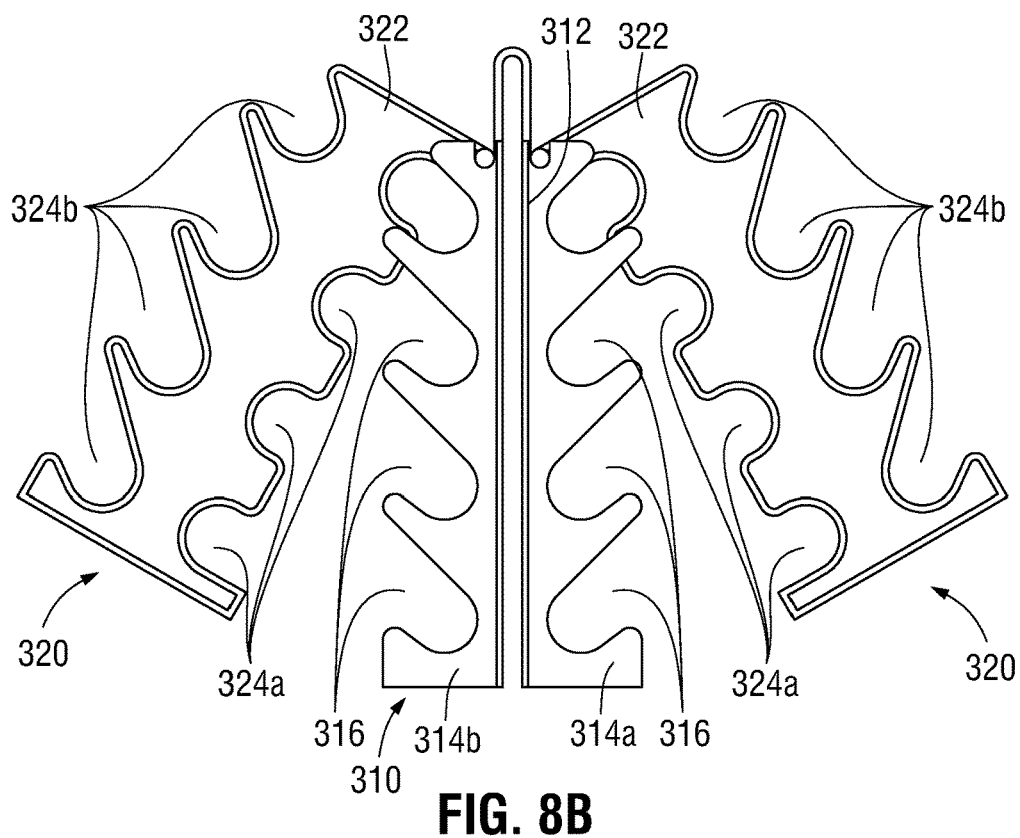
Figure 9A:
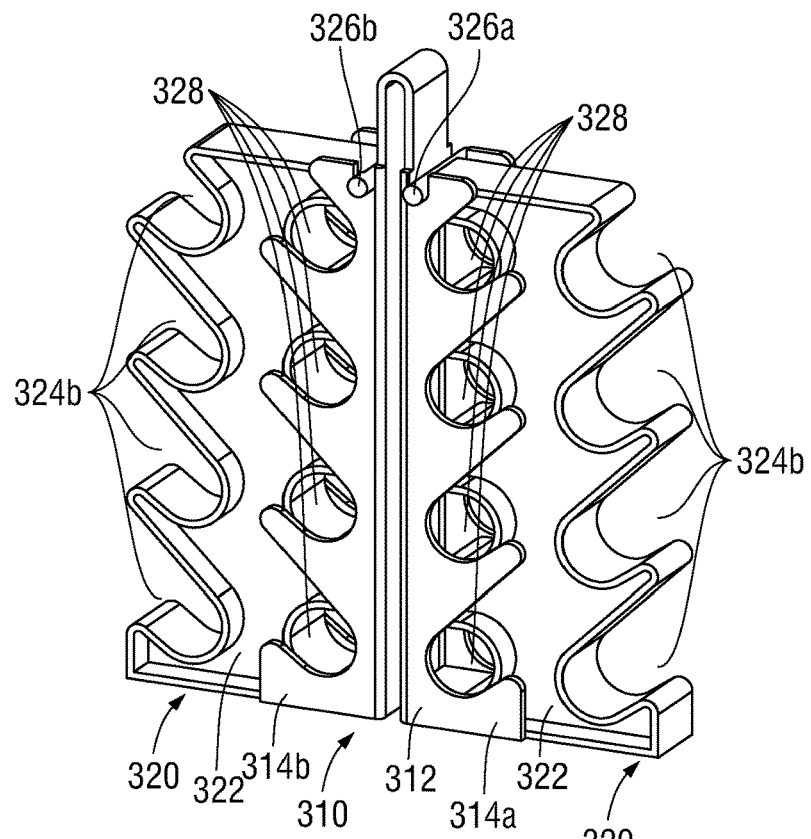
FIGS. 9A and 9B are perspective and front views, respectively, of the cable management system of FIGS. 6A and 6B with the intermediate wings disposed in closed positions relative to the center base.
Figure 9B:
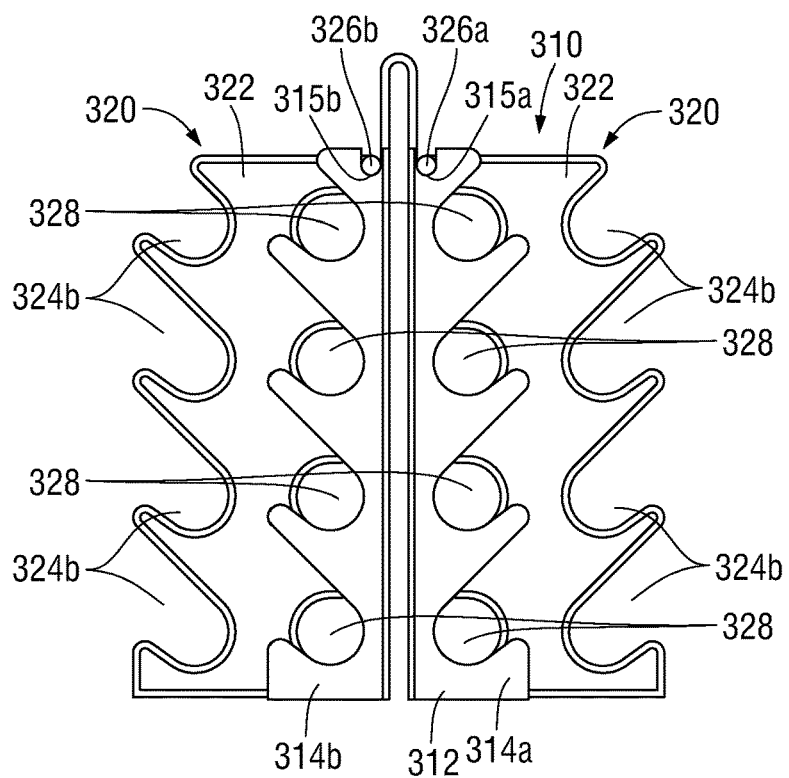

Center base 310, as illustrated in FIGS. 7A and 7B, includes a spine 312 and a plurality of branches 314a, 314b extending outwardly from each side 313a, 313b, respectively, of spine 312. Branches 314a, 314b define bifurcated configurations such that elongated slots 313c, 313d are defined extending the length of spine 312 on each side 313a, 313b, respectively, thereof. Each branch 314a, 314b defines a channel 316 having an open end and a semi-circular closed end. Channels 316 may be disposed at angles relative to spine 312 of between about 30 degrees and about 60 degrees, although other angles are also contemplated. Center base 310 further includes engagement notches 315a, 315b at an upper end of spine 312 on either side 313a, 313b thereof and a neck 315c extending upwardly from the upper end of spine 312 between the engagement notches 315a, 315b. In embodiments, neck 315c defines an elongated channel 315d configured to permit passage of a support cable therethrough from an open lower end of channel 315d to a closed upper end of channel 315d to enable suspension of center base 310 from the support cable, although center base 310 (or other portion of cable management system 300) may alternatively or additionally be mounted, suspended, or otherwise attached to a support cable and/or other structure in any other suitable manner.

With reference to FIGS. 8A-9B, each of the first and second intermediate wings 320 includes a body 322 defining an inwardly-facing side and an outwardly-facing side. A plurality of inwardly-facing, open, semi-cylindrical channels 324a are defined on the inwardly-facing side of body 322 of each intermediate wing 320 and a plurality of outwardly-facing, open, semi-cylindrical channels 324b are defined on the outwardly-facing side of body 322 of each intermediate wing 320. Each intermediate wing 320 further includes a pin 326a, 326b disposed on the inwardly-facing side thereof at an upper end thereof. Pins 326a, 326b are configured to snap-into engagement within engagement notches 315a, 315b to pivotably couple the first and second intermediate wings 320 with center base 310 on either side thereof.

With the first and second intermediate wings 320 pivotably coupled to center base 310 on either side thereof, first and second intermediate wings 320 are able to independently pivot relative to center base 310 from an open position (see FIGS. 8A and 8B), wherein wings 320 are spaced-apart from channels 316 of branches 314a, 314b of center base 310 to enable insertion of cables through the open ends of channels 316 to be seated within the semi-circular closed ends of channels 316, to a closed position (see FIGS. 9A and 9B), wherein and first and second intermediate wings 320 extend at least partially into channels elongated slots 313c, 313d such that inwardly-facing channels 324a of bodies 322 of first and second intermediate wings 320 cooperate with the corresponding channels 316 of center base 310 to enclose channels 316 and define cylindrical passages 328 capturing the cables therein.

Figure 10A:
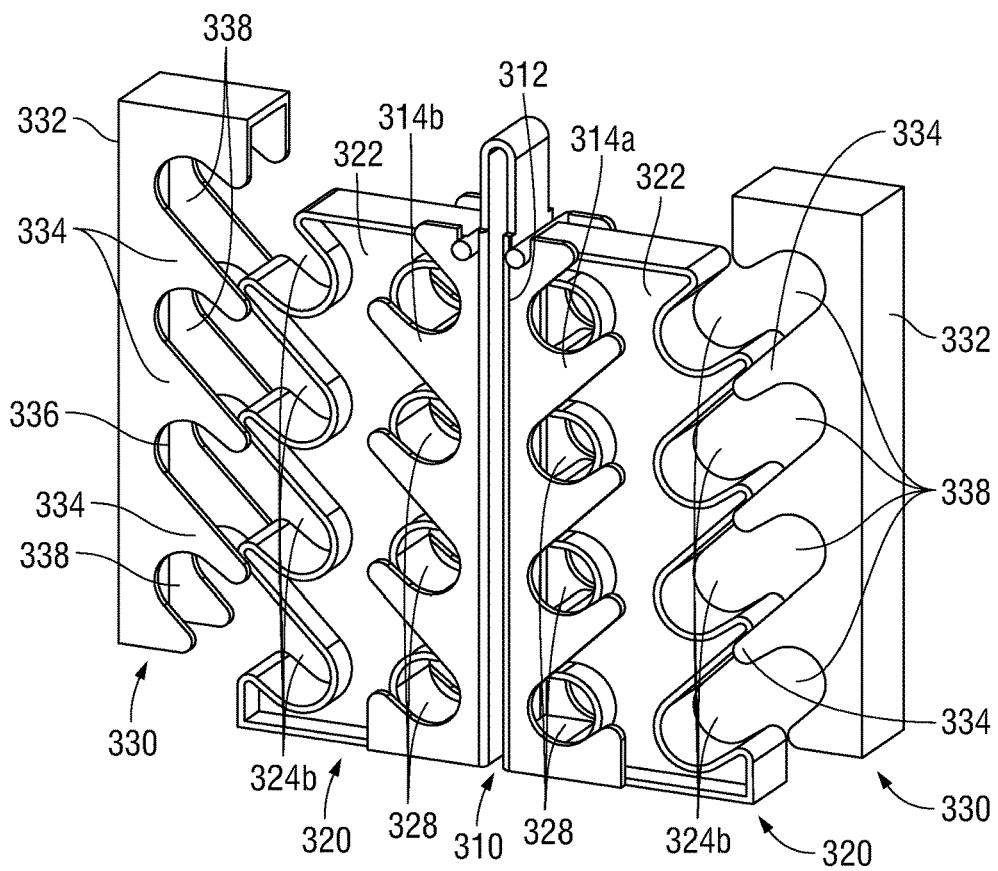
FIGS. 10A and 10B are partially-exploded perspective and partially-exploded front views, respectively, illustrating outer wings configured for positioning about the intermediate wings of the cable management system of FIGS. 6A and 6B.
Figure 10B:
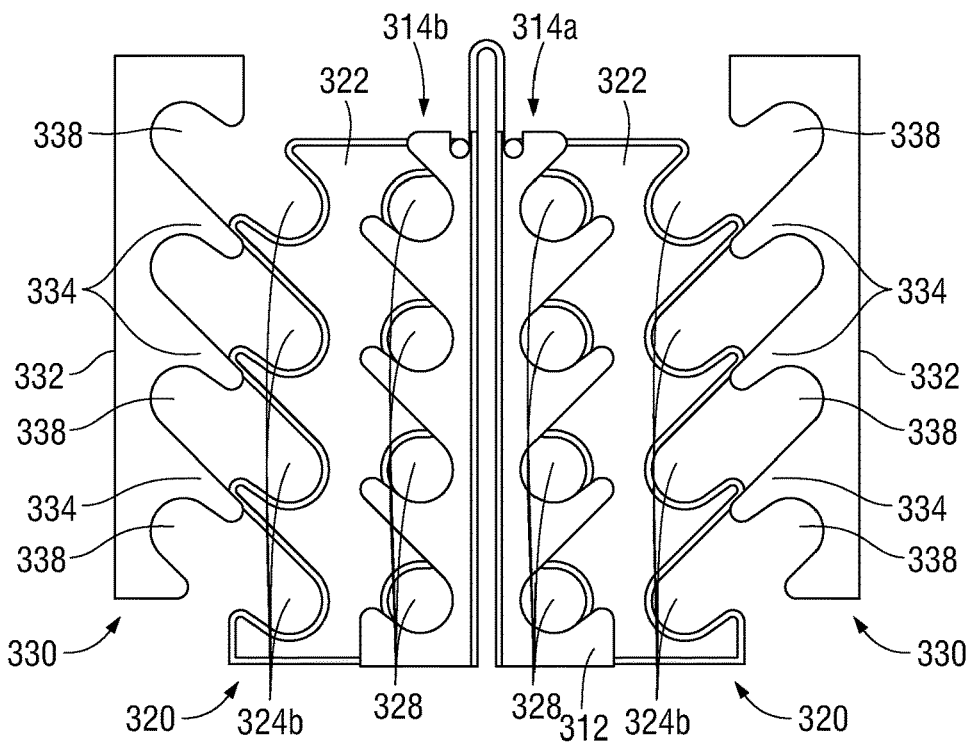

Referring to FIGS. 10A and 10B, first and second outer wings 330 each include a body 332 having a plurality branches 334 extending from an inwardly-facing side thereof. Branches 334 define bifurcated configurations such that an elongated slot 336 extends along the length of body 332 between the bifurcated branches 334. Each branch 334 defines an open, semi-cylindrical channel 338.

With additional reference to FIGS. 6A and 6B, first and second outer wings 330 are configured to slide into engagement about first and second intermediate wings 320 with bodies 322 of intermediate wings 320 slidably received within slots 336 of outer wings 330. In a disengaged position (FIGS. 10A and 10B), wherein first and second outer wings 330 are not engaged with first and second intermediate wings 320, cables can be inserted through the open ends of outwardly-facing channels 324b of bodies 322 of intermediate wings 320 to be seated at the semi-circular closed ends thereof. However, when first and second outer wings 330 are slid into engagement about first and second intermediate wings 320 to the engaged position (FIGS. 6A and 6B), channels 338 of branches 334 of first and second outer wings 330 cooperate with the corresponding outwardly-facing channels 324b of bodies 322 of intermediate wings 320 to enclose channels 324b and define cylindrical passages 340 capturing the cables therein.

In the fully assembled state of cable management system 300, wherein intermediate wings 320 are disposed in the closed position and outer wings 330 are disposed in the engaged position, the pluralities of cylindrical passages 328, 340 retain cables therein and maintain sufficient spacing between the cables to inhibit interference and/or eliminate the need to de-rate the cables.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed:

1. A cable management system, comprising:
    a cable-retaining spacer block formed from a plurality of block components stacked relative to one another, each block component of the plurality of block components cooperating with at least one adjacently-stacked block component of the plurality of block components to define a row of cylindrical passages such that the cable-retaining spacer block includes a plurality of rows of cylindrical passages arranged to define a rectangular array, each cylindrical passage of the plurality of cylindrical passages configured to receive a transmission cable; and first and second brackets positioned at first and second end portions, respectively, of the cable-retaining spacer block, each of the first and second brackets configured for suspension from a support cable, wherein at least one block component of the plurality of block components includes first and second cantilever engagement feet extending outwardly from the first and second end portions of the cable-retaining spacer block, the first and second cantilever engagement feet including first and second inwardly-facing engagement features, respectively, the first and second cantilever engagement feet configured to overlap the first and second brackets, respectively, whereby the first and second inwardly-facing engagement features of the at least one block component engage first and second outwardly-facing engagement features of the first and second brackets, respectively, to thereby suspend the cable-retaining spacer block between and from the support cables.

2. The cable management system according to claim 1, wherein the plurality of block components includes a base block component, a cover block component, and a plurality of intermediate block components disposed between the base block component and the cover block component.

3. The cable management system according to claim 1, wherein each block component of the plurality of block components defines at least one row of semi- cylindrical channels that cooperates with a row of semi-cylindrical channels of the at least one adjacently-stacked block component of the plurality of block components to define the row of cylindrical passages.

4. The cable management system according to claim 1, wherein the plurality of block components are configured to be alternatingly loaded with transmission cables and stacked relative to one another.

5. The cable management system according to claim 1, wherein each of the first and second brackets includes a notch configured to receive the respective support cable.

6. The cable management system according to claim 5, wherein each of the first and second brackets is configured to expand and resiliently return to receive and engage the respective support cable.

7. The cable management system according to claim 1, wherein at least one of the cable-retaining spacer block or the first and second brackets is configured to be supported on a mounting structure.

8. The cable management system according to claim 7, wherein the at least one of the cable-retaining spacer block or the first and second brackets is configured to be supported on a platform of the mounting structure.

9. The cable management system according to claim 7, wherein the mounting structure is configured to be secured to at least one vertical support.

10. The cable management system according to claim 1, wherein the first and second inwardly-facing engagement features of the first and second cantilever engagement feet, respectively, are configured for interlocking engagement with the first and second outwardly-facing engagement features of the first and second brackets, respectively.

11. The cable management system according to claim 10, wherein the first and second outwardly-facing engagement features of the first and second brackets are first and second cantilever engagement legs, respectively.

12. The cable management system according to claim 1, wherein the first and second cantilever engagement feet are monolithically formed with the at least one block component.

13. The cable management system according to claim 1, wherein more than one block component of the plurality of block components but less than all block components of the plurality of block components includes first and second cantilever engagement feet.

* * * * *